(12) United States Patent
Watson et al.

(10) Patent No.: US 11,750,706 B1
(45) Date of Patent: Sep. 5, 2023

(54) DATA TRANSMISSION TIME MANAGEMENT

(71) Applicant: Amazon Technologies, Inc., Seattle, WA (US)

(72) Inventors: Ryan F. Watson, Seattle, WA (US); Bennett Barnes Lynch, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 14 days.

(21) Appl. No.: 16/831,544

(22) Filed: Mar. 26, 2020

(51) Int. Cl.
| | | |
|---|---|---|
| *G06F 15/16* | (2006.01) | |
| *H04L 67/145* | (2022.01) | |
| *H04L 67/06* | (2022.01) | |
| *H04L 67/12* | (2022.01) | |
| *G06F 3/06* | (2006.01) | |
| *G06F 3/12* | (2006.01) | |

(52) U.S. Cl.
CPC .......... *H04L 67/145* (2013.01); *G06F 3/067* (2013.01); *G06F 3/0617* (2013.01); *G06F 3/0656* (2013.01); *G06F 3/0659* (2013.01); *G06F 3/1236* (2013.01); *G06F 3/1295* (2013.01); *H04L 67/06* (2013.01); *H04L 67/12* (2013.01)

(58) Field of Classification Search
CPC ....... H04L 67/145; H04L 67/12; H04L 67/06; H04L 47/10; H04L 47/30; H04L 43/16; H04L 1/0002; H04L 49/90; H04L 67/568; G06F 3/067; G06F 3/0656; G06F 3/0659; G06F 3/1236; G06F 3/1295; G06F 13/1673; G06F 13/24; G06F 2212/7203
See application file for complete search history.

(56) References Cited

U.S. PATENT DOCUMENTS

| | | | |
|---|---|---|---|
| 8,214,707 B2* | 7/2012 | Munson | ............... H04L 1/1848 714/748 |
| 8,531,944 B2 | 9/2013 | Plamondon | |
| 9,998,394 B2* | 6/2018 | Agrawal | ................ H04L 43/16 |

(Continued)

OTHER PUBLICATIONS

U.S. Appl. No. 16/831,720, filed Mar. 26, 2020, Ryan F. Watson.
Office Action from U.S. Appl. No. 16/831,720, dated Feb. 12, 2021, pp. 1-37.

*Primary Examiner* — Dustin Nguyen
*Assistant Examiner* — Hao H Nguyen
(74) *Attorney, Agent, or Firm* — Robert C. Kowert; Kowert, Hood, Munyon, Rankin & Goetzel, P.C.

(57) ABSTRACT

A system for scheduling transmission times to avoid connection timeouts includes a memory configured to store data in a buffer for upload to a storage system. The system also includes one or more computing devices configured to implement a connection manager. The connection manager is configured to establish a connection to a storage system. The connection manager is configured to iteratively repeat, until the data transfer operation is completed, begin transmitting the data from the buffer via the connection to the storage system, stop transmitting the data from the buffer via the connection to the storage system, where at least a portion of the data is retained in the buffer, determine a time to resume transmitting the data from the buffer via the connection to the storage system to avoid a connection timeout for the connection to the storage system, and wait until the time to resume.

20 Claims, 9 Drawing Sheets

(56) References Cited

U.S. PATENT DOCUMENTS

| | | | |
|---|---|---|---|
| 2002/0003845 A1* | 1/2002 | Kamiya | H04L 25/14 375/340 |
| 2003/0172220 A1* | 9/2003 | Hao | H04L 43/16 710/305 |
| 2003/0179727 A1* | 9/2003 | Soong | H04W 52/241 370/328 |
| 2003/0210651 A1* | 11/2003 | Tzeng | H04L 47/24 370/231 |
| 2005/0180445 A1* | 8/2005 | Cheng | H04L 47/266 370/428 |
| 2007/0028138 A1* | 2/2007 | Noya | G06F 3/0673 714/6.12 |
| 2007/0060135 A1* | 3/2007 | Lin | H04L 12/66 455/445 |
| 2008/0074545 A1* | 3/2008 | Matsubayashi | H04N 21/44004 375/E7.024 |
| 2008/0095193 A1 | 4/2008 | Gaedke | |
| 2009/0116503 A1* | 5/2009 | Sebastian | H04L 47/30 370/412 |
| 2009/0210588 A1 | 8/2009 | Adachi | |
| 2010/0271667 A1* | 10/2010 | Nakata | H04N 1/00798 358/406 |
| 2013/0195210 A1* | 8/2013 | Swarbrick | H04L 47/24 375/259 |
| 2014/0149535 A1* | 5/2014 | Fong | H04L 67/04 709/214 |
| 2014/0344506 A1* | 11/2014 | Wang | G06F 3/0619 711/104 |
| 2014/0379963 A1* | 12/2014 | Kazama | G06F 3/0659 711/103 |
| 2015/0237199 A1* | 8/2015 | Hameenniemi | H04M 3/2236 455/422.1 |
| 2015/0366895 A1* | 12/2015 | Leedman | A61P 35/00 514/44 A |
| 2016/0267037 A1* | 9/2016 | Kim | G06F 13/1673 |
| 2017/0309088 A1* | 10/2017 | Arya | H04L 67/2842 |
| 2018/0113630 A1* | 4/2018 | Ishiguro | G06F 3/0613 |
| 2018/0188952 A1 | 7/2018 | Carlton | |
| 2018/0242908 A1* | 8/2018 | Sazonov | A61B 5/4542 |
| 2019/0317667 A1* | 10/2019 | Killamsetti | G06F 16/27 |
| 2020/0026460 A1* | 1/2020 | Shin | G06F 12/0246 |
| 2020/0053650 A1* | 2/2020 | Moner Poy | H04L 5/0055 |

* cited by examiner

DATA TRANSMISSION TIME MANAGEMENT

BACKGROUND

Data storage systems include a client-facing server and a data storage server that is maintained on the backend of the system. A client generally might not have direct access to the data storage server. The client may interface with the client-facing server in order to transfer data to or from the data storage server. Data may be stored to a buffer on the client-facing server to facilitate data transfer such that the buffer acts as an intermediary between the client and the data storage server due to a potential bandwidth difference a connection between the client and the client-facing server and a connection between the client-facing server and the data storage server.

The client may send data to the client-facing server to be uploaded to data storage server. The client-facing server may establish a connection to the data storage server to facilitate transmission of the data from the client-facing server to the data storage server. The connection to the data storage server may be subject to an idle timeout such that inactive connections may be disconnected by the end of a timeout period. When the connection between the client and the client-facing server is slow and/or inconsistent, the client-facing server may not have enough data in the buffer to keep the connection to the data storage server open due to the idle timeout.

Figure 1:
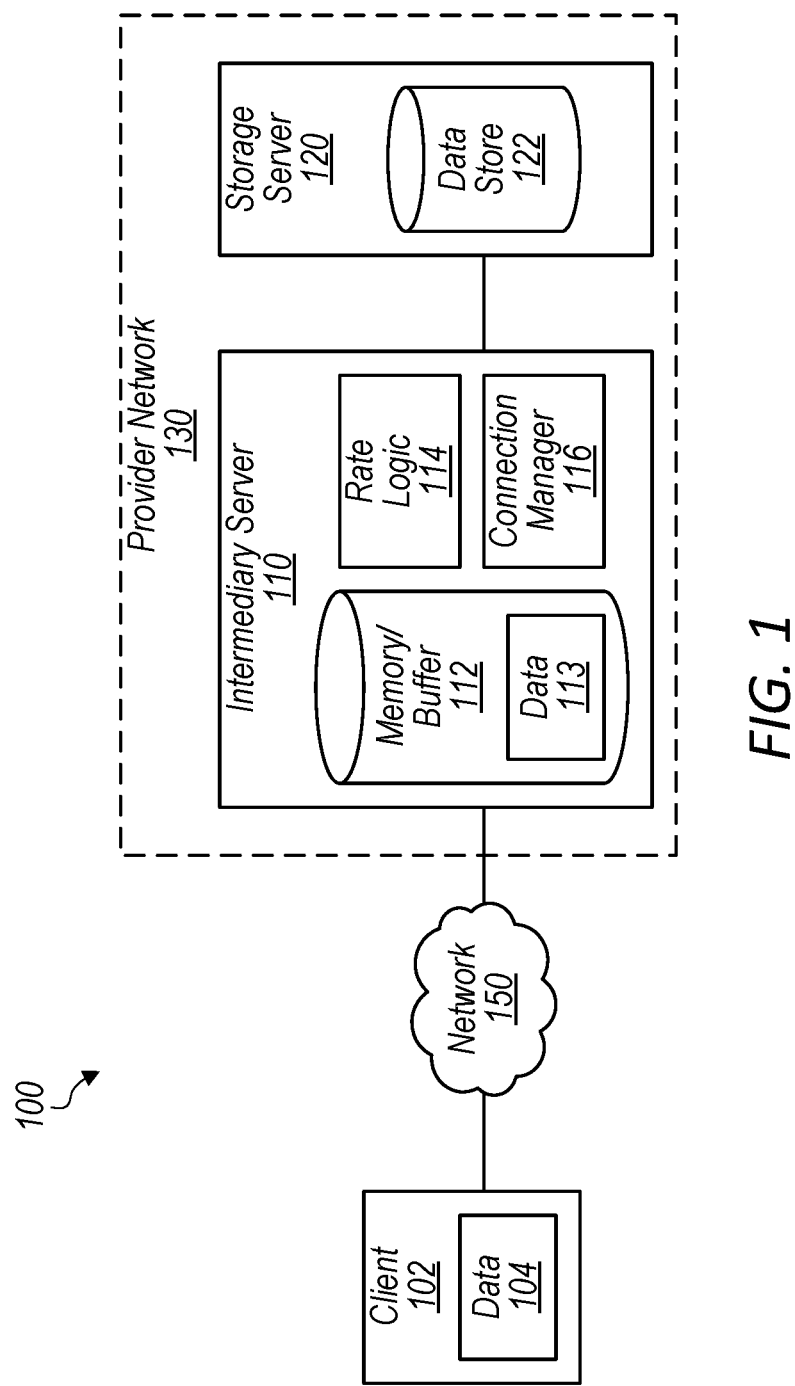
FIG. 1 illustrates a block diagram of a data storage system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of systems and processes for maintaining open connections for data uploads between an intermediary server and a backend server is disclosed.

In one aspect of the invention, a system for an intermediary server is disclosed. The system includes an input interface configured to establish, via one or more programmatic interfaces, a connection with a client device to receive data for upload to a storage server and measure an input rate of the data received from the client device. The system also includes a memory configured to store the data in a buffer as the data is received. The system further includes an output interface configured to establish a connection with the storage server, determine an output rate for sending the data from the buffer to the storage server based at least in part on the input rate and a timeout value for the storage server, and send the data from the buffer to the storage server at the output rate.

In another aspect of the invention, a method is disclosed herein. The method includes receiving, at an intermediary server, data from a client device at an input rate. The method also includes storing the data in a buffer as the data is received. The method further includes establishing, at the intermediary server, a connection with a storage server. The method yet also includes determining an output rate for sending the data from the buffer to the storage server based at least in part on the input rate and a timeout value for the storage server. The method further includes sending, from the intermediary server, the data from the buffer to the storage server at the output rate.

In yet another aspect of the invention, one or more non-transitory, computer-readable storage media are disclosed. The one or more or more non-transitory, computer-readable storage media store instructions that, when executed on or across one or more processors, cause the one or more processors to store, in a buffer, data received from a client at an input rate. The instructions cause the one or more processors to establish a connection with a storage server. The instructions further cause the one or more processors to determine an output rate for sending the data from the buffer to the storage server based at least in part on the input rate and a timeout value for the storage server. The instructions also cause the one or more processors to send the data from the buffer to the storage server at the output rate.

In an alternative aspect of the invention, a system is disclosed. The system includes a memory configured to store data in a buffer for upload to a storage system. The system also includes one or more computing devices configured to implement a connection manager. The connection manager is configured to establish a connection to a storage system. The connection manager is configured to iteratively repeat, until the data transfer operation is completed: begin transmitting the data from the buffer via the connection to the storage system; stop transmitting the data from the buffer via the connection to the storage system, wherein at least a portion of the data is retained in the buffer; determine a time to resume transmitting the data from the buffer via the connection to the storage system to avoid a connection timeout for the connection to the storage system; and wait until the time to resume. The connection manager is configured to send remaining data or additional data from the buffer via the connection to the storage system.

In yet another aspect of the invention, a method is disclosed. The method includes performing, with one or more computing devices: storing data in a buffer for upload to a storage system according to a data transfer operation. The method also includes establishing a connection with the storage system. The method further includes iteratively repeating, until the data transfer operation is completed: beginning transmission of the data from the buffer via the connection to the storage system; stopping the transmission of the data, wherein at least a portion of the data is retained in the buffer; determining a time to resume the transmission of the data to avoid a connection timeout on the connection with the storage system; and waiting until the time to resume. The method may also include sending remaining data or additional data from the buffer to the storage system.

In another aspect of the invention, one or more non-transitory, computer-readable storage media are disclosed. The one or more non-transitory, computer-readable storage media storing instructions are executed on or across one or more processors. The instructions may cause the one or more processors to store data in a buffer for upload to a storage system according to a data transfer operation. The instructions may cause the one or more processors to establish a connection to the storage system. The instructions may cause the one or more processors to iteratively repeat, until the data transfer operation is completed: begin transmitting the data from the buffer to the storage system; stop transmitting the data, wherein at least a portion of the data is retained in the buffer; determine a time to resume the transmission of the data to avoid a connection timeout of the connection with the storage system; and wait until the time to resume. The instructions may cause the one or more processors to send remaining data from the buffer to the storage system.

FIG. 1 illustrates a block diagram of a data storage system 100, according to some embodiments. The data storage system 100 may include a client 102, an intermediary server 110, and a storage server 120. The client 102 may include data 104 that is to be uploaded and stored to the storage server 120, according to some embodiments. In some embodiments, the intermediary server 110 and the storage server 120 may be included as part of a provider network 130. The intermediary server 110 may also be referred to as a proxy server or a buffer server. The intermediary server 110 may also serve as a client-facing server that is accessible by the client 102 via one or more application programming interfaces (APIs). The storage server 120 may also be referred to as a backend server or a destination server or a backend destination or a transmission destination. The provider network 130 may be configured to offer distributed computing services and/or resources to clients, including the client 102. For example, the provider network 130 may offer a data storage service to store data to a remote server, such as the storage server 120.

The client 102 may be configured to communicate with the intermediary server 110 via a network 150, according to some embodiments. For example, the network 150 may include one or more of a local area network (LAN) connection, a wide area network (WAN) connection, the Internet, an intranet, or any combination thereof. In some embodiments, the client 102 may send a request to upload data 104 to the data storage system 100. For example, the client 102 may communicate a request to upload the data 104 to the intermediary server 110 via one or more application programmatic interfaces (APIs) provided by the provider network 130. In some embodiments, the client 102 may be configured to transmit the data 104 to the intermediary server 110 via the network 150. For example, the client 102 may send the data 104 over a secured connection established with the intermediary server 110 via the network 150. In some embodiments, the connection request may include a request for a particular timeout value to be used by the storage server 120.

The intermediary server 110 may include a memory 112, rate logic 114, and a connection manager 116, according to some embodiments. The intermediary server 110 may receive data 104 from the client 102, as described above. In some embodiments, the memory 112 may be configured to act as a buffer for received data to be transferred to a subsequent destination. For example, the intermediary server 110 may store the data 104 as buffered data 113 to the memory 112 as the data 104 is received. In some embodiments, the buffer may have a target amount of buffered data 113 to retain. For example, the buffer may be configured to have a minimum threshold amount of buffered data 113 such that the buffer maintains the target amount of buffered data 113.

The connection manager 116 may be configured to manage one or more network interfaces, according to some embodiments. For example, the one or more network interfaces may include an input network interface configured to receive data from an external source (e.g., the client 102) and an output network interface configured to send data to a destination (e.g., the storage server 120). The one or more network interfaces may include networking components configured to operate on networking standards such as Ethernet, 802.11x, Fibre Channel storage area network (SAN), etc. In some embodiments, the connection manager 116 may be configured to measure transmission speeds for data transfers via the one or more network interfaces. For example, the connection manager 116 may be configured to measure an input rate of data transferred via the input network interface and an output rate of data transferred via the output network interface. In some embodiments, the connection manager 116 may record the input rate and the output rate to a log of historical data about the input rate and the output rate. In some embodiments, the connection manager 116 may be a part of an input network interface that is configured to measure incoming connections.

Rate logic 114 may receive information from the connection manager 116 that indicates the input rate and the output rate, according to some embodiments. For example, the connection manager 116 may be configured to send information indicating the input rate and the output rate to the rate logic 114. In some embodiments, rate logic 114 may determine the output rate for the connection manager 116 based on the input rate. For example, rate logic 114 may determine the output rate as to not exceed the input rate. In some embodiments, setting the output rate to be less than or equal to the input rate allows the buffer to maintain retention of buffered data 113 while also outputting the data to the storage server 120. For example, the buffer may be configured to maintain a target amount of buffered data 113, as described herein, such that data being output at the output rate that is less than or equal to the input rate may result in a size of the buffer being maintained at the target amount of buffered data 113.

Rate logic 114 may be configured to set the output rate to a maximum possible transmission rate based on a determination that the data 104 is completely transmitted to the intermediary server 110. For example, rate logic 114 may determine that transmission of the data 104 from the client 102 to the intermediary server 110 is complete based on an indication provided by one or more of the client 102 or the connection manager 116. Based on the determination that the transmission of the data 104 is complete, rate logic 114 may determine to send any remaining or unsent or additional data from the buffer to the storage server 120. In some embodiments, a determination that the transmission of the data 104 being complete may indicate that the intermediary server 110 no longer needs to maintain a consistent connection to the storage server 120 to avoid a potential timeout due to inactivity. In some embodiments, rate logic 114 may indicate to the connection manager 116 that the buffer is to be purged of received data by sending all of the received data to a destination, such as the storage server 120.

The connection manager 116 may periodically and/or repeatedly monitor the input rate, according to some embodiments. For example, the connection manager 116 may periodically and/or repeatedly determine changes in the input rate over a duration of the receiving the data 104 from the client 102. During the transmission of the data 104, the connection manager 116 may be configured to determine whether the connection to the client device has become slow, interrupted, intermittent, inconsistent, or any combination thereof. For example, the connection manager 116 may detect that an interruption has occurred with respect to receiving the data 104 from the client 102. Based on a determination that the interruption has occurred, rate logic 114 or the connection manager 116 may allow the buffer to fall below the target amount of data while data is being sent to the storage server 120. In some embodiments, the output rate may be further adjusted by rate logic 114 to accommodate for having a buffer size below the target amount of data.

Rate logic 114 may send an indication of the output rate to the connection manager 116, according to some embodiments. For example, rate logic 114 may send a message or a data packet to the connection manager 116 that includes an indication of the output rate. In some embodiments, the connection manager 116 may limit the output network interface to a transmission rate according to the output rate as determined by rate logic 114. For example, the connection manager 116 may limit the transmission rate of the output network interface to be no greater than the output rate determined by rate logic 114. In some embodiments, the connection manager 116 may send buffered data 113 or cause the buffered data 113 to be sent at the determined output rate from the buffer in the memory 112 from the intermediary server 110 to the storage server 120. For example, the connection manager 116 may retrieve the buffered data 113 from the memory 112 and send the buffered data 113 at a transmission rate that is no greater than the determined output rate to the storage server 120.

The storage server 120 may include a data store 122, according to some embodiments. For example, the storage server 120 may be configured to store data received from one or more sources, including the intermediary server 110 or a direct connection to one or more clients. In some embodiments, the storage server 120 may receive inbound connections from the intermediary server 110 as to restrict access to known components of the provider network 130. For example, the provider network 130 may be configured to prevent backend servers from being access by outside entities beyond the scope of trusted components within the provider network 130.

The storage server 120 may be configured to receive data from the intermediary server 110, according to some embodiments. For example, the storage server 120 may receive the buffered data 113 from the intermediary server 110. In some embodiments, the storage server 120 may have a high bandwidth connection to the intermediary server 110 capable of fast transmissions of data. For example, a connection between the intermediary server 110 and the storage server 120 may have transmission rates that are higher or faster relative to transmission rates over connections between the client 102 and the intermediary server 110. In some embodiments, the storage server 120 may store the buffered data 113 received from the intermediary server 110 to a data store 122. For example, the storage server 120 may transfer the buffered data 113 from an input interface to the data store 122 in one or more storage locations associated with the client 102.

Figure 2:
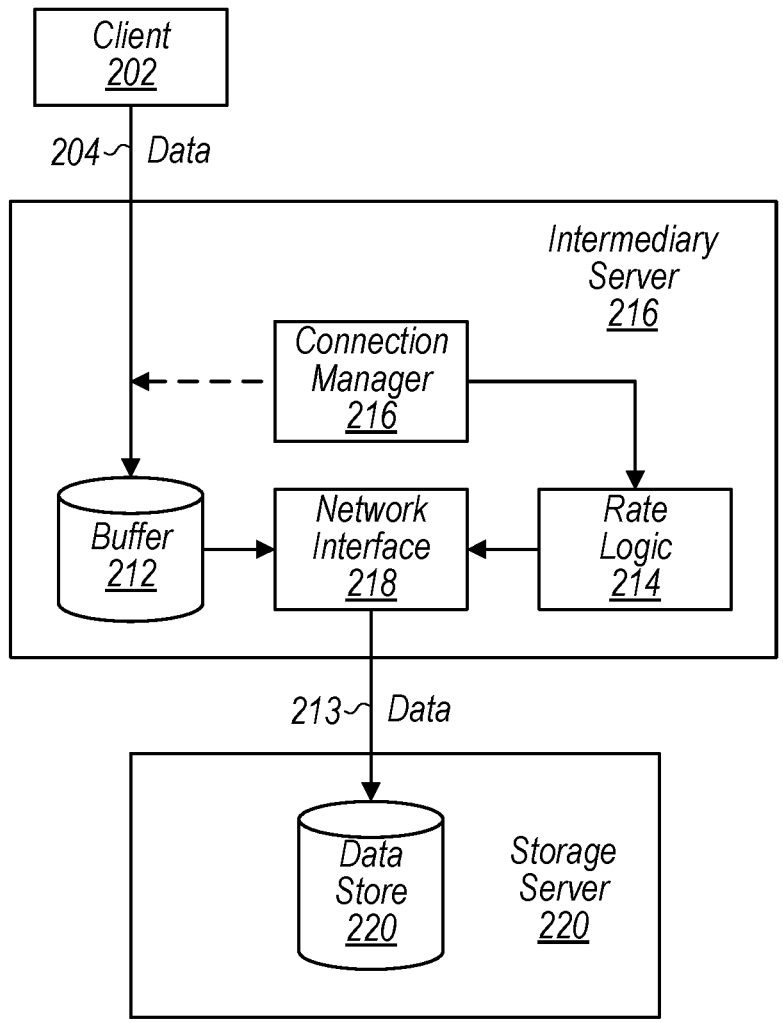
FIG. 2 illustrates a data flow diagram for a data storage system, according to some embodiments.

FIG. 2 illustrates a data flow diagram 200 for a data storage system, according to some embodiments. The data storage system may correspond to the data storage system 100 of FIG. 1, according to some embodiments.

A client 202 may be configured to send data 204 to an intermediary server 210, according to some embodiments. For example, the client 202 may send a request to the intermediary server 210 to upload the data 204 to a storage server 220. The client 202 may send the data 204 over a network connection at an input rate.

The intermediary server 210 may store the data to a buffer 212, according to some embodiments. For example, the intermediary server 210 may include a memory configured to function as a buffer 212 for the data 204 sent by the client 202. In some embodiments, the buffer 212 may be configured to continue to store the data 204 until a target amount of data 204 is stored to the buffer 212.

The intermediary server 210 may include a connection manager 216 configured to monitor incoming and outgoing transmissions of data to and from the intermediary server 210, according to some embodiments. For example, the connection manager 216 may be configured to monitor the input rate over the connection between the client 202 and the intermediary server 210. In some embodiments, the connection manager 216 may provide an indication of the input rate to rate logic 214. For example, the connection manager 216 may be configured to send data indicating the input rate to rate logic 214.

Rate logic 214 may be configured to determine an output rate for sending data from the buffer 212 to the storage server 220, according to some embodiments. For example, rate logic 214 may calculate the output rate for sending the data based at least in part on the input rate. In some embodiments, the output rate may be set to be less than or equal to the input rate. For example, the output rate may be equal to the input rate to ensure that the buffer 212 is not depleted of data while the client 202 is in the process of sending data 204 to the intermediary server 210.

The connection manager 216 may be configured to continually monitor the input rate to determine changes to the quality of the connection between the client 202 and the intermediary server 210. For example, the connection manager 216 may detect situations in which the connection between the client 202 and the intermediary server 210 becomes slow, intermittent, inconsistent, or interrupted. In some embodiments, the connection manager 216 may determine when a threshold difference exists between a first measured input rate and a second measured input rate. For example, the connection manager 216 may determine that a service disruption may have occurred based on detecting that the second measured input rate is 50% slower than the first measured input rate. The threshold difference described herein is an illustrative example, where different embodiments may have different thresholds to accommodate for varying tolerances of connection stability. In other embodiments, the connection manager 216 may detect an interruption of the connection with the client 202. For example, the connection manager 216 may detect that the input rate has become zero or near-zero such that the connection may be disconnected or otherwise interrupted.

Based on a determination that the connection to the client 202 is slow, intermittent, inconsistent, or interrupted, the connection manager 216 may cause rate logic 214 to recalculate the output rate according to the input rate, according to some embodiments. For example, rate logic 214 may lower the output rate in response to determining that the input rate has slowed down. As another example, rate logic 214 may lower the output rate to a significantly slower rate in order to keep the connection to the storage server 220 while the connection to the client 202 has become interrupted. Rate logic 214 may indicate the output rate to a network interface 218, according to some embodiments. For example, rate logic 214 may send data including an indication of the output rate to the network interface 218. In some embodiments, the connection manager 216 may determine that the client 202 has completed uploading the data 204 to the buffer 212. Based on a determination that the client 202 has completed uploading the data 204, the connection manager 216 may indicate to rate logic 214 that the client 202 has completed uploading the data 204. In some embodiments, rate logic 214 may set the output rate to an unlimited rate such that the connection to the storage server 220 is not restricted by a determined output rate.

The network interface 218 may be configured to send data 213 from the buffer 212, according to some embodiments. For example, the network interface 218 may be instructed to retrieve buffered data from the buffer 212 to transmit to the storage server 220. In some embodiments, the network interface 218 may be configured to adhere to the output rate provided by rate logic 214. For example, the network interface 218 may be configured to limit or throttle outbound connections to the output rate.

The storage server 220 may receive the data 213 from the intermediary server 210, according to some embodiments. The storage server 220 may store the data 213 to a storage destination. For example, the storage server 220 may store the data 213 to a data store 222. In some embodiments, the data 213 may be stored in portions of the data store 222 associated with the client 202. For example, the data store 222 may include one or more partitions that are dedicated to the client 202.

Figure 3:
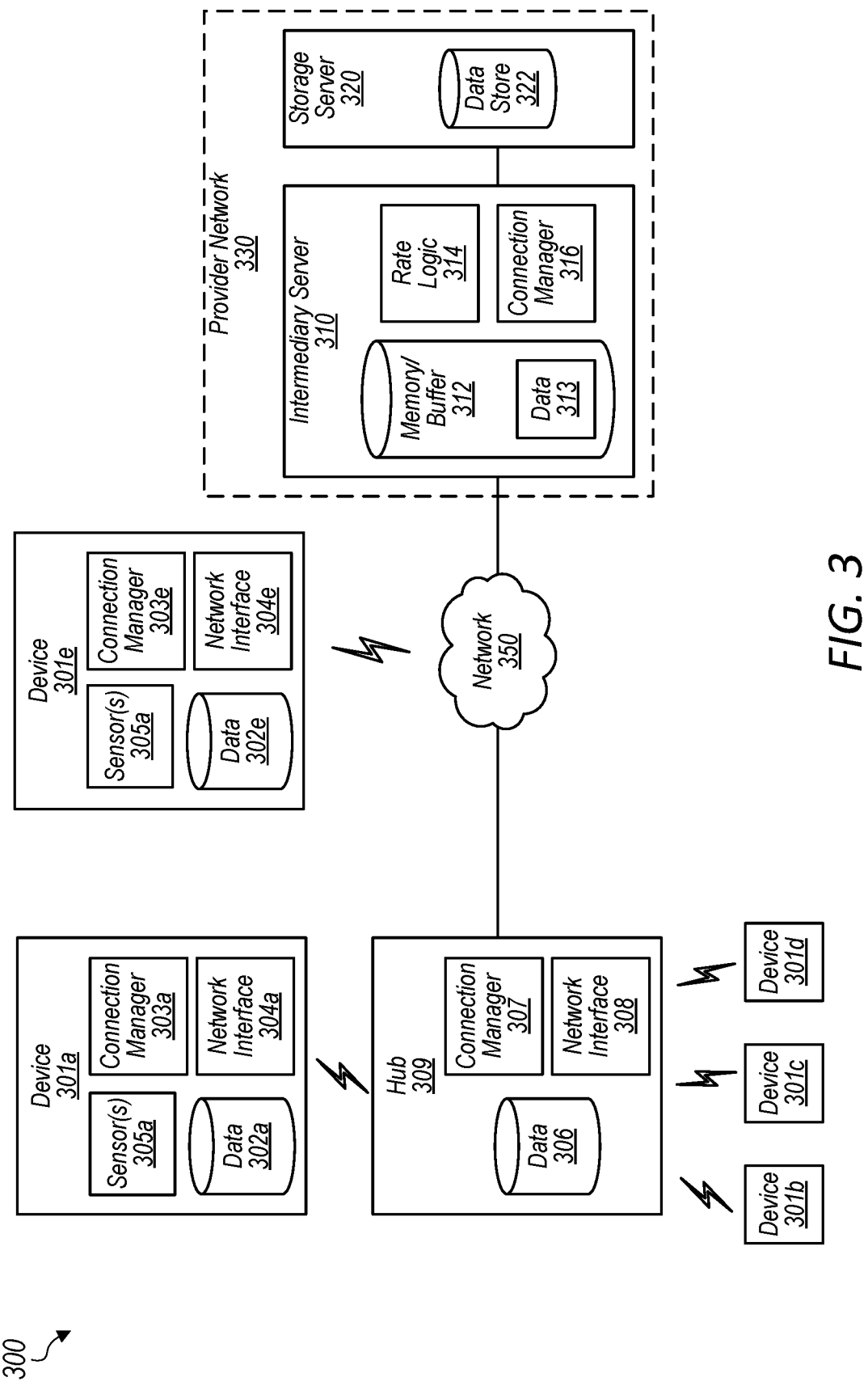
FIG. 3 illustrates a block diagram of a data storage system, according to some embodiments.

FIG. 3 illustrates a block diagram of a data storage system 300, according to some embodiments. The data storage system 300 may include a plurality of devices 301a, 301b, 301c, 301d, 301e, a hub 309, a network 350, an intermediary server 310, and a storage server 320, according to some embodiments. In some embodiments, the intermediary server 310 and the storage server 320 may be included as part of a provider network 330. The intermediary server 310 may also be referred to as a proxy server or a buffer server. The storage server 320 may also be referred to as a backend server or a destination server or a backend destination. The provider network 330 may be configured to offer distributed computing services and/or resources to clients, including the plurality of devices 301a . . . 301d, the device 301e, and the hub 309. For example, the provider network 330 may offer a data storage service to store data to a remote server, such as the storage server 320.

The plurality of devices 301a . . . e may include one or more sensors 305a . . . e including one or more of sensor devices, camera devices, thermostat devices, lighting devices, or other Internet of Things (IoT) devices, in some embodiments. The plurality of devices 301a . . . d may be communicatively coupled to the hub 309. For example, the plurality of devices 301a . . . d may utilize a connection based on 802.11x, Zigbee, Bluetooth, Z-Wave, a wireless ad hoc network, RuBee or any other suitable communication standard. As another example, the plurality of devices 301a . . . d may utilize a wired connection to the hub 309. In some embodiments, the plurality of devices 301a . . . d may generate data to be sent to provider network 330. For example, the plurality of devices 301a . . . d may record data including sensor data or camera data to be stored on the storage server 320.

The plurality of devices 301a . . . d may provide data to the hub 309 to be sent to the provider network 330, according to some embodiments. For example, the plurality of devices 301a . . . d may not necessarily be configured to directly interact with the network 350 based on the available communication protocols used by the plurality of devices 301a . . . d.

As an illustrative example, the device 301a may include a connection manager 303a and a network interface 304a. The device 301a may generate data 302a to be sent to the hub 309. The device 301a may be a low power device such that enabling the network interface 304a for a long duration of time may cost battery power that the device 301a might be configured to conserve. The device 301a may include a connection manager 303a configured to activate the network interface 304a to transmit at least a portion of the data 302a from the buffer to hub 309. For example, the connection manager 303a may enable the network interface 304a to send at least a portion of the data 302a from the buffer to the hub 309. In some embodiments, the device 301a may transfer less than all of the data 302a from the buffer such that at least a portion of the data 302a is retained in the buffer. The device 301a may cease sending the data 302a to the hub 309 to avoid sending all of the data 302a resulting in an unintentionally idle connection to the hub 309. The connection manager 303a may disable or deactivate the network interface 304a to conserve power and/or bandwidth.

Based on the timeout value, the connection manager 303a may determine a time to transmit data to the hub 309, according to some embodiments. For example, the connection manager 303a may determine a time that is prior to the timeout value occurring. By transmitting additional data to the storage system prior to the connection timing out, the connection may be held open for the device 301a to transmit additional data at a subsequent time. In some embodiments, the time to transmit data may be determined based on the last transmission of data and the timeout value. For example, the time to transmit data may be determined based on a termination time when the last transmission of data occurred plus the timeout value and subtracting a small amount of time, such as 1 ms to 1 s or longer, to ensure that additional data is transmitted prior to the connection being timed out.

At the time to transmit data to the hub 309, the connection manager 303a may enable or reactivate the network interface 304a to transmit additional data of the data 302a to the hub 309. The connection manager 303a may repeatedly perform activation and deactivation of the network interface 304a until a point in time in which no additional data is generated by the device 301a. When no additional data is to be provided by the device 301a, the connection manager 303a may enable the network interface 304a to send all of the data 302a remaining in the buffer based on a determination that the connection to the hub 309 no longer needs to be maintained to avoid inactivity.

The hub 309 may be configured to store data from the plurality of devices 301a . . . d as data 304. In some embodiments, the hub 309 may store data 304 to a buffer implemented on a memory of the hub 309. The hub 309 may be configured to send the data 304 to the provider network 330 via the network 350, according to some embodiments. For example, the hub 309 may include a network interface 306 configured to establish a connection to an intermediary server 310 of the provider network 330 via one or more APIs over the network 350. As part of establishing the connection, the hub 309 may receive an indication of a timeout value corresponding to the intermediary server 310. As an alternative, the hub 309 may inform the intermediary server 310 that a particular timeout value is requested. The timeout value may indicate a period of time in which inactivity is allowed over the connection to the intermediary server 310 before the connection is terminated by the intermediary server 310.

The hub 309 may be configured to activate the network interface 306 to transmit at least a portion of the data 304 from the buffer to provider network 330. For example, the hub 309 may enable the network interface 306 to send at least a portion of the data 304 from the buffer to the intermediary server 310. In some embodiments, the hub 309 may transfer less than all of the data 304 from the buffer such that at least a portion of the data 304 is retained in the buffer. The hub 309 may cease sending the data 304 to the intermediary server 310 to avoid sending all of the data 304 resulting in an unintentionally idle connection to the intermediary server 310. The hub 309 may disable or deactivate the network interface 306 to conserve power and/or bandwidth.

Based on the timeout value, the hub 309 may determine a time to transmit data to the storage system, according to some embodiments. For example, the hub 309 may determine a time that is prior to the timeout value occurring. By transmitting additional data to the storage system prior to the connection timing out, the connection may be held open for the hub 309 to transmit additional data at a subsequent time. In some embodiments, the time to transmit data may be determined based on the last transmission of data and the timeout value. For example, the time to transmit data may be determined based on a termination time when the last transmission of data occurred plus the timeout value and subtracting a small amount of time, such as 1 ms to 1 s or longer, to ensure that additional data is transmitted prior to the connection being timed out.

At the time to transmit data to the storage system, the hub 309 may enable or reactivate the network interface 306 to transmit additional data of the data 304 to the intermediary server 310. The hub 309 may repeatedly perform activation and deactivation of the network interface 306 until a point in time in which no additional data is received from the plurality of devices 301a . . . d. For example, the plurality of devices 301a . . . d may indicate that data transfer to the hub 309 is complete. When no additional data is to be provided by the plurality of devices 301a . . . d, the hub 309 may enable the network interface 306 to send all of the data 304 remaining in the buffer based on a determination that the connection to the intermediary server 310 no longer needs to be maintained to avoid inactivity.

As an alternative embodiment, a device 301e may be configured to directly connect to the network 350 without an intermediary device, such as the hub 309. The device 301e may store data 302e to a memory or a storage medium. The device 301e may include a network interface 304e that may be enabled or disabled based on commands generated by the device 301e. In some embodiments, the device 301e may generate data 302e based on one or more sensors 305e or components of the device 301e. For example, the one or more sensors 305e may include one or more of a temperature sensor, a camera, a microphone, a proximity sensor, a motion sensor, etc. configured to generate one or more of generate one or more of temperature data, image data, audio data, proximity data, or motion data.

The device 301e may be a low power device such that enabling the network interface 304e for a long duration of time may cost battery power that the device 301e might be configured to conserve. The device 301e may include a connection manager 303e configured to activate the network interface 304e to transmit at least a portion of the data 302e from the buffer to provider network 330. For example, the connection manager 303e may enable the network interface 304e to send at least a portion of the data 302e from the buffer to the intermediary server 310. In some embodiments, the device 301e may transfer less than all of the data 302e from the buffer such that at least a portion of the data 302e is retained in the buffer. The device 301e may cease sending the data 302e to the intermediary server 310 to avoid sending all of the data 302e resulting in an unintentionally idle connection to the intermediary server 310. The connection manager 303e may disable or deactivate the network interface 304e to conserve power and/or bandwidth.

Based on the timeout value, the connection manager 303e may determine a time to transmit data to the storage system, according to some embodiments. For example, the connection manager 303e may determine a time that is prior to the timeout value occurring. By transmitting additional data to the storage system prior to the connection timing out, the connection may be held open for the device 301e to transmit additional data at a subsequent time. In some embodiments, the time to transmit data may be determined based on the last transmission of data and the timeout value. For example, the time to transmit data may be determined based on a termination time when the last transmission of data occurred plus the timeout value and subtracting a small amount of time, such as 1 ms to 1 s or longer, to ensure that additional data is transmitted prior to the connection being timed out.

At the time to transmit data to the storage system, the connection manager 303e may enable or reactivate the network interface 304e to transmit additional data of the data 302e to the intermediary server 310. The connection manager 303e may repeatedly perform activation and deactivation of the network interface 304e until a point in time in which no additional data is generated by the device 301e. When no additional data is to be provided by the device 301e, the connection manager 303e may enable the network interface 304e to send all of the data 302e remaining in the buffer based on a determination that the connection to the intermediary server 310 no longer needs to be maintained to avoid inactivity.

The intermediary server 310 may include a memory 312 configured to store and buffer data 313 based on data received from one or more of the hub 309 or the device 301e, such as the data 302a or the data 302e. The intermediary server 310 may also include rate logic 314 and a connection manager 316 configured to operate in a manner similar to that of rate logic 114 and the connection manager 116 of FIG. 1. The provider network 330 may also include a storage server 320 configured to store data received from the intermediary serve 310 in a data store 322, similar to the storage server 120 of FIG. 1.

Figure 4:
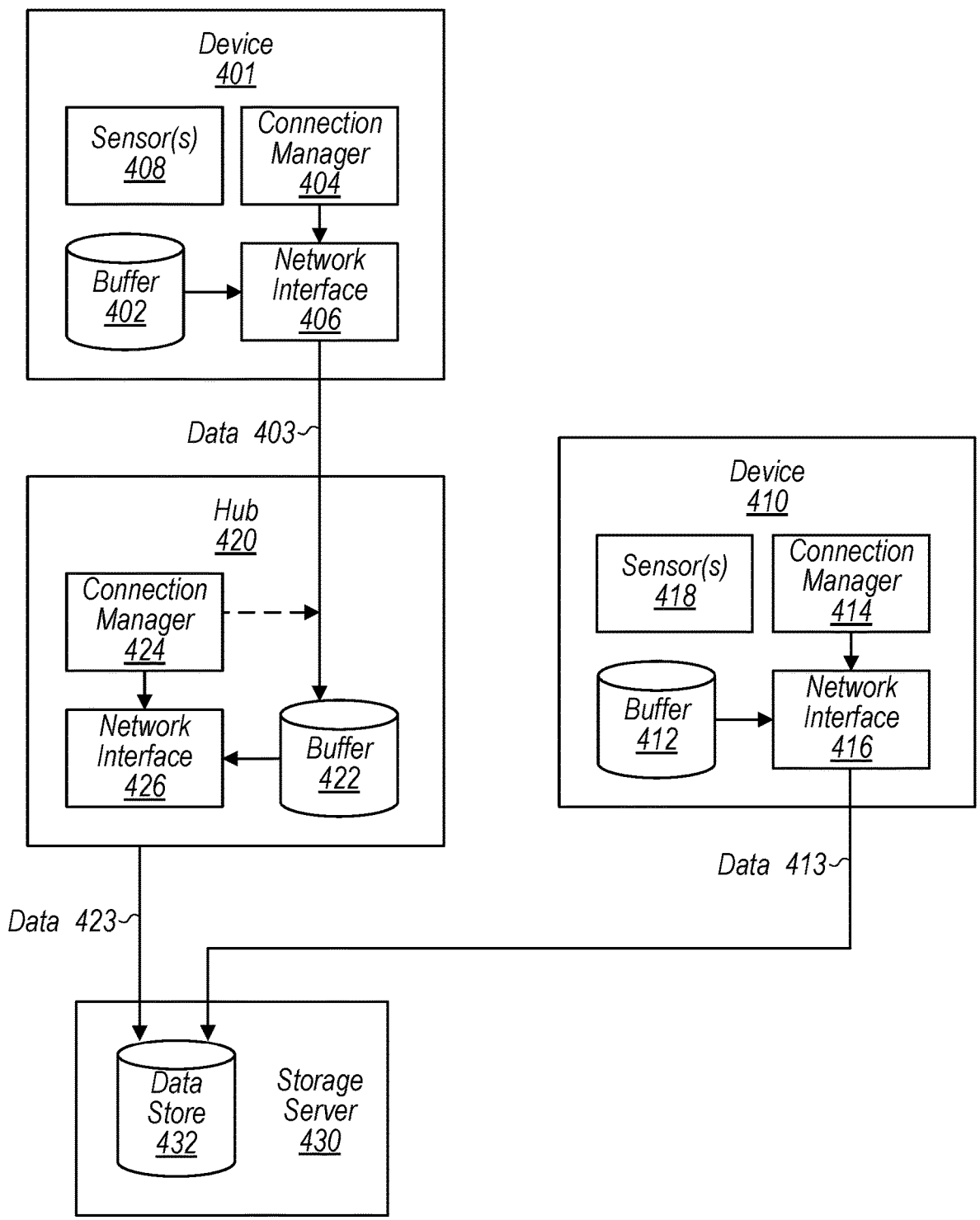
FIG. 4 illustrates a data flow diagram for a data storage system, according to some embodiments.

FIG. 4 illustrates a data flow diagram 400 for a data storage system, according to some embodiments. The data storage system may correspond to the data storage system 300 of FIG. 3. In some embodiments, a device 401 or a device 410 may include one or more of an IoT device, a sensor device, a camera device, etc.

The device 401 may be configured to transmit data 403 to a hub 420. For example, the device 401 may send a request to the hub 420 to upload the data 403 from a buffer 402 to a storage server 430. In some embodiments, the device 401 may generate data based on one or more sensors 408 or components of the device 401. For example, the device 401 may include one or more sensors 408 including one or more of a temperature sensor, a camera, a microphone, a proximity sensor, a motion sensor, etc. configured to generate one or more of temperature data, image data, audio data, proximity data, or motion data.

The device 401 may include a network interface 406 that may be enabled or disabled based on commands generated by a connection manager 404. In some embodiments, the network interface 406 may be a wireless networking interface. The connection manager 404 may be configured to enable or disable the network interface 406 to conserve power and/or bandwidth of the device 401.

The hub 420 may be configured to store the data 403 to a buffer 412, according to some embodiments. For example, the hub 420 may include a memory or a storage device configured to store the data 403 in a buffer 422. In some embodiments, the buffer 422 may be configured to continue to store the data 403 until a target amount of data 403 is stored to the buffer 422.

The hub 420 may include a network interface 426 configured to send data to the storage server 430. The network interface 426 may include a wireless networking interface. The hub 420 may include a connection manager 424 configured to enable the network interface 426 on a sparse basis, according to some embodiments. For example, the connection manager 424 may enable the network interface 426 to send at least a portion of the data 413 from the buffer 422 to the storage server 430. In some embodiments, the hub 420 may transfer less than all of the data 413 from the buffer 422 such that at least a portion of the data 423 is retained in the buffer 422. The hub 309 may cease sending the data 413 to the storage server 430 to avoid sending all of the buffer 422 resulting in an unintentionally idle connection to the storage server 430. The connection manager 424 may disable or deactivate the network interface 426 to conserve power and/or bandwidth.

The connection manager may monitor an input rate of the data 403. Based on the input rate and a timeout value for the storage server 430, the connection manager 424 may determine a time delay to transmit additional data to the storage server 430, according to some embodiments. For example, the connection manager 424 may determine a time delay that is shorter than the timeout value such that transmitting additional data after waiting for the time delay to elapse but before the timeout value would result in avoiding the connection to the storage server timing out. The connection manager 424 may wait until the time delay has elapsed before continuing to send the data 413.

After the time delay has elapsed, the connection manager 424 may enable or reactivate the network interface 426 to transmit additional data of the data 423 from the buffer 422 to the storage server 430. The connection manager 424 may repeatedly perform activation and deactivation of the network interface 426 until a point in time in which no additional data is received from the device 402. For example, the device 401 may indicate that data transfer to the hub 420 is complete. When no additional data is to be provided by the device 401, the connection manager 424 may enable the network interface 426 to send all of the data 423 remaining in the buffer 422 based on a determination that the connection to the storage server 430 no longer needs to be maintained to avoid inactivity.

As an alternative embodiment, a device 410 may be configured to directly connect to the storage server 430 without an intermediary device, such as the hub 420. The device 410 may store data to a memory or a storage medium, such as a buffer 412. The device 410 may include a network interface 408 that may be enabled or disabled based on commands generated by the device 410. In some embodiments, the device 410 may generate data based on one or more sensors 418 or components of the device 410. For example, the device 410 may include one or more sensors 418 including one or more of a temperature sensor, a camera, a microphone, a proximity sensor, a motion sensor, etc. configured to generate one or more of temperature data, image data, audio data, proximity data, or motion data.

The device 410 may be a low power device such that enabling the network interface 408 for a long duration of time may cost battery power that the device 410 might be configured to conserve. The device 410 may include a connection manager 414 configured to activate the network interface 426 to transmit at least a portion of the data 413 from the buffer 412 to the storage server 430. For example, the connection manager 414 may enable the network interface 408 to send at least a portion of the data 413 from the buffer 412 to the storage server 430. In some embodiments, the connection manager 414 may transfer less than all of the data 413 from the buffer 412 such that at least a portion of the data 413 is retained in the buffer 412. The connection manager 414 may cease sending the data 413 to the storage server 430 to avoid sending all of the data 413 resulting in an unintentionally idle connection to the storage server 430. The connection manager 414 may disable or deactivate the network interface 408 to conserve power and/or bandwidth.

Based on the timeout value for the storage server 430, the connection manager 414 may determine a time to transmit data to the storage system, according to some embodiments. For example, the connection manager 414 may determine a time that is prior to the timeout value occurring. By transmitting additional data to the storage system prior to the connection timing out, the connection may be held open for the connection manager 414 to transmit additional data at a subsequent time. In some embodiments, the time to transmit data may be determined based on the last transmission of data and the timeout value. For example, the time to transmit data may be determined based on a termination time when the last transmission of data occurred plus the timeout value and subtracting a small amount of time, such as 1 ms to 1 s or longer, to ensure that additional data is transmitted prior to the connection being timed out.

At the time to transmit data to the storage system, the connection manager 414 may enable or reactivate the network interface 408 to transmit additional data of the data 413 to the storage server 430. The connection manager 414 may repeatedly perform activation and deactivation of the network interface 408 until a point in time in which no additional data is generated by the device 410. When no additional data is to be provided by the device 410, the connection manager 414 may enable the network interface 408 to send all of the data 413 remaining in the buffer 412 based on a determination that the connection to the storage server 430 no longer needs to be maintained to avoid inactivity.

The storage server 430 may receive the data 423 from the hub 420 or the data 413 from the device 410. The storage server 430 may include a data store 432 configured to store the received data.

Figure 5:
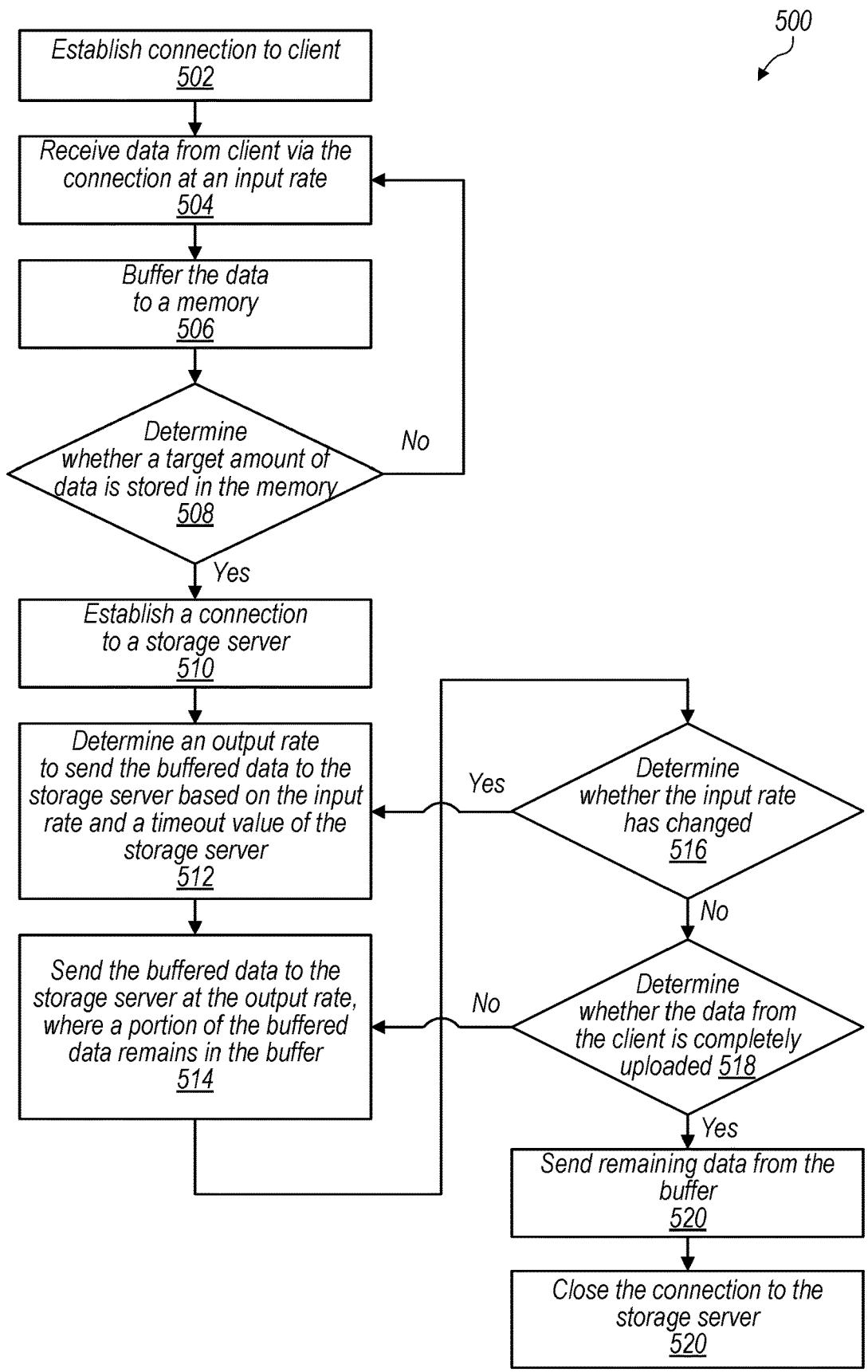
FIG. 5 illustrates a flowchart diagram of a method for transferring data within a data storage system, according to some embodiments.

FIG. 5 illustrates a flowchart diagram of a method 500 for transferring data within a data storage system, according to some embodiments. The method 500 may be performed by an intermediary server, such as the intermediary server 110 of FIG. 1, the intermediary server 210 of FIG. 2, the intermediary server 310 of FIG. 3. In other embodiments, the method 500 may be performed by an IoT hub, such as the hub 402 or the hub 420 of FIG. 4.

The method 500 includes the intermediary server establishing a connection to a client, at 502. The client may correspond to the client 102 of FIG. 1. In some embodiments, the intermediary server may establish the connection to the client in response to a request from the client. For example, the client may be configured to send a connection request when the client is preparing to send data to the data storage system. In some embodiments, the client may send the connection request via one or more programmatic interfaces. For example, the intermediary server may provide one or more application programmatic interfaces (APIs) accessible and/or usable by the client to transmit the connection request. In some embodiments, the connection request may include a request for a particular timeout value to be used by the storage server.

The method 500 also includes the intermediary server receiving data from the client via the connection, at 504. The data may be received from the client at an input rate representing the speed in which the data is being transferred, according to some embodiments. In some embodiments, the intermediary server may be configured to measure the input rate over the connection. For example, the intermediary server may include an input module configured to measure inbound connections, such as the connection to the client, to record the input rate of the transmission of the data from the client.

The method 500 further includes the intermediary server buffering the data to a memory, at 506. In some embodiments, the intermediary server may include one or more storage elements, such as a memory or data store, configured to store data received from clients or the data storage server. For example, the intermediary server may implement a buffer to store received data in a transitory manner to facility transfer of the data to a destination for the data. In some embodiments, the intermediary server may be configured to store the data to the buffer as the data is received from the client.

The method 500 also includes the intermediary server determining whether a target amount of data is stored in the memory, at 508. In some embodiments, the intermediary server may defer establishing the connection to the data storage server until the buffer has stored a target amount of data. For example, the buffer may store up to and including the target amount of data and inform one or more other components of the intermediary server that the buffer has reached the target amount of data stored. In some embodiments, the target amount of data may be an amount of data that can be transmitted at the output rate throughout a duration of time corresponding to the timeout value such that the buffer may not be emptied. For example, the target amount of data may be determined based on multiplying the input rate by the timeout value to establish the target amount of data. In other embodiments, the target amount of data may be a predetermined amount of data established for the buffer. Based on a determination that the target amount of data has not been stored in the memory, the method 500 may return to 504. Based on a determination that the target amount of data has been stored in the memory, the memory 500 may continue to 510.

The method 500 also includes the intermediary server establishing a connection to a data storage server, at 510. The intermediary server may establish a connection using one or more output network interfaces. In some embodiments, establishing the connection to the data storage server may include receiving an indication of a timeout value from the data storage server. In other embodiments, establishing the connection to the data storage server may include sending a request indicating a particular timeout value that the intermediary server requests to be the timeout value used by the data storage server. In other embodiments, the intermediary server and the data storage server may negotiate the timeout value such that both entities mutually agree on the timeout value.

The method 500 further includes determining an output rate to send the buffered data to the data storage server based on the input rate and a timeout value of the storage server, at 512. The data storage server may be interchangeably referred to as a backend server or a backend destination based on its relative location in the data storage system. The intermediary server may use the input rate as a potential maximum value for the output rate such that the output rate does not exceed the input rate. When the output rate does not exceed the input rate, the connection to the data storage server is maintained as an active connection because the intermediary server sends the buffered data at a rate less than or equal to a rate in which additional data is buffered. The intermediary server may also determine the output rate based on the timeout value of the data storage server such that the output rate ensures that data is transmitted to the data storage server prior to the connection timing out.

The method 500 also includes sending the buffered data to the data storage server at the output rate, where a portion of the buffered data remains in the buffer, at 514. In some embodiments, the output rate may be a data transfer rate that is configured to maintain the connection between the intermediary server and the data storage server. For example, the intermediary server may send the buffered data to the data storage server at the output rate to ensure that the connection to the data storage server is not prematurely terminated due to inactivity. In some embodiments, the buffer may maintain at least a portion of the buffered data. For example, the portion of the buffered data may ensure that some data is buffered in the event of the client having an interruption during sending of the data.

The method 500 may also include determining whether the input rate has changed, at 516. In some embodiments, the intermediary server may be configured to measure the input rate of the connection to the client, as described above. For example, the intermediary server may include an input module configured to measure inbound connections, such as the connection to the client, to record the input rate of the transmission of the data from the client. In some embodiments, the intermediary server may determine that the input rate is too slow relative to a bandwidth capability between the intermediary server and the data storage server. For example, the intermediary server may determine that a transfer speed between the intermediary server and the data storage server is orders of magnitude larger than the input rate from the client. In the event that the transfer speed between the intermediary server and the data storage server is significantly larger, the buffered data may be sent from the intermediary server to the data storage server such that the buffer on the intermediary server is emptied or zeroed out during the time in which the client is uploading data to the intermediary server. In other situations, the connection to the client may be intermittent such that the data is inconsistently uploaded to the intermediary server. For example, the client may upload portions of the data in small bursts with gaps of inactivity between the portions. In this situation, the intermediary server may determine that sending the buffered data to the data storage server may cause the buffer to be emptied or zeroed out. When the buffer is empty, the intermediary server is unable to send additional data to the data storage server and is subject to the data storage server's idle timeout period. In some embodiments, the intermediary server may be configured to determine that the input rate from the client has increased. For example, the intermediary server may determine that a slow connection from the client has become faster over time. Based on a determination that the input rate has changed, the method 500 may return to 512 to determine a new output rate. Based on a determination that the input rate has not changed, the method 500 may continue to 518.

The method 500 may further include determining whether the data from the client is completely uploaded to the intermediary server, at 518. In some embodiments, the client may be configured to notify the intermediary server that the data is completely uploaded. For example, the client may be configured to send a notification to the intermediary server indicating that uploading the data is complete such as indicating a total file size, a checksum, a hash value or other identifying metadata for the data. In other embodiments, the intermediary server may be configured to detect that the data is completely uploaded based on metadata provided by the client. For example, metadata for the data may be included with the data to indicate information that may be used by the intermediary server to proactively determine that the data is completely uploaded. Based on a determination that the data from the client is not completely uploaded to the intermediary server, the method 500 may return to 514 to continue sending the buffered data to the data storage server at the output rate. Based on a determination that the data from the client is completely uploaded, the method 500 may continue to 520.

The method 500 may include sending remaining data or additional data from the buffer, at 520. In some embodiments, the intermediary server may send the remaining data or additional data at full speed based on a determination that the data is completely uploaded by the client, as described above. For example, the intermediary server may be configured to remove the output rate as a bandwidth limitation to maximize bandwidth utilization over the connection with the data storage server. In some embodiments, the output rate may be utilized to ensure that the connection to the data storage server is active during a period of time in which the data is uploaded to the intermediary server from the client. After the client has completed the upload of the data, the output rate may no longer be necessary. The method 500 may conclude by closing the connection to the storage server, at 522.

Figure 6:
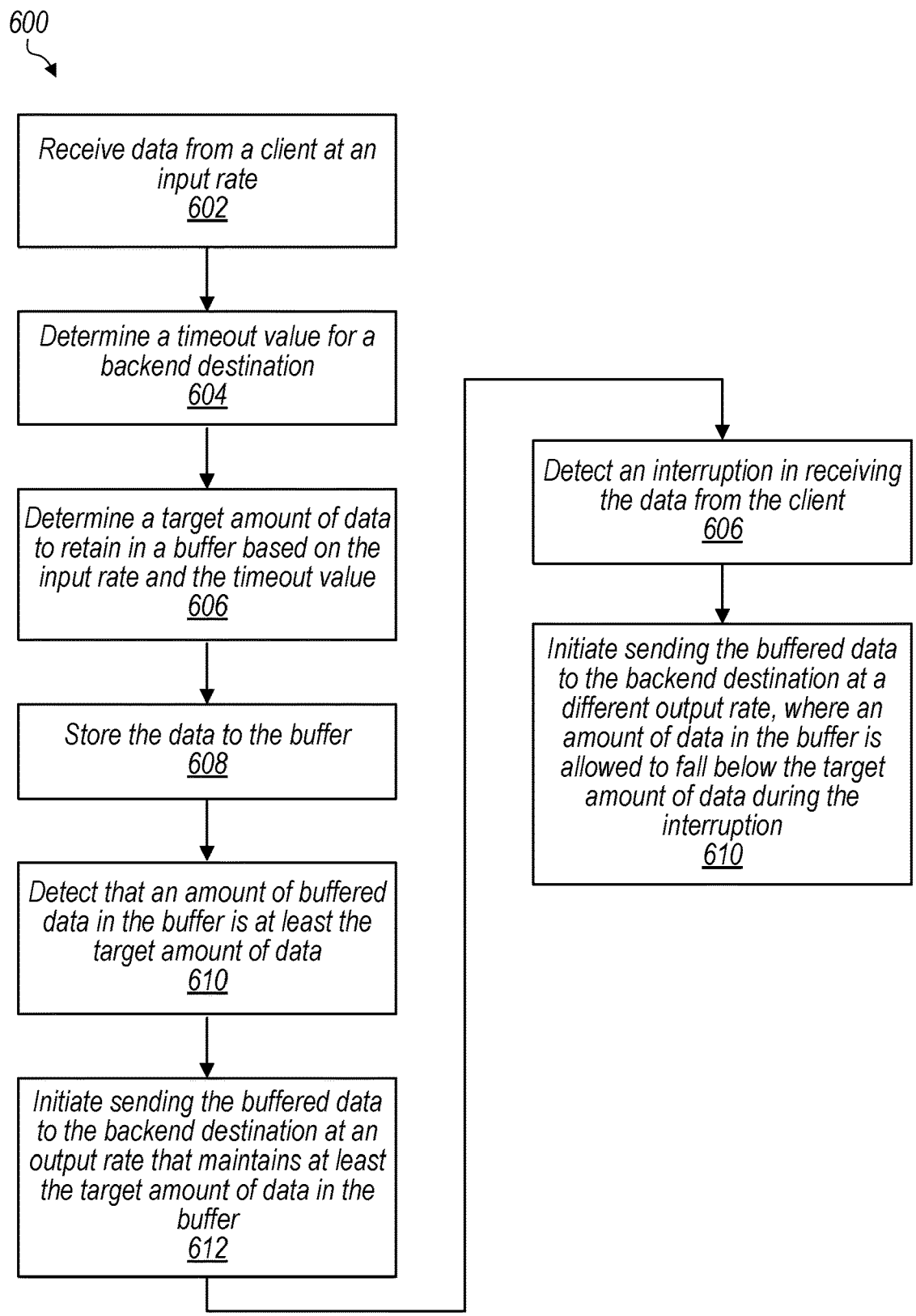
FIG. 6 illustrates a flowchart diagram of a method for managing an interruption of a connection from a client, according to some embodiments.

FIG. 6 illustrates a flowchart diagram of a method 600 for managing an interruption of a connection from a client, according to some embodiments. The method 600 may be performed by an intermediary server, such as the intermediary server 110 of FIG. 1, the intermediary server 210 of FIG. 2, the intermediary server 310 of FIG. 3, or the hub 420 of FIG. 4.

The method 600 begins by receiving data from a client at an input rate, at 602. The data may be received from the client at an input rate representing the speed in which the data is being transferred, according to some embodiments. In some embodiments, the intermediary server may be configured to measure the input rate over the connection. For example, the intermediary server may include an input module configured to measure inbound connections, such as the connection to the client, to record the input rate of the transmission of the data from the client.

The method 600 includes determining a timeout value for a backend destination, at 604. In some embodiments, the timeout value may be determined based on historical data indicating previous timeouts of connections with the backend destination. For example, the historical data may indicate how much time passed between a last transmission time and a time in which the previous connection was timed out. In other embodiments, the backend destination may indicate the timeout value. In other embodiments, a requested timeout value may be indicated to the backend destination.

The method 600 also includes determining a target amount of data to retain in a buffer based on the input rate and the timeout value, at 606. In some embodiments, the target amount of data may be an amount of data that can be transmitted at the output rate throughout a duration of time corresponding to the timeout value such that the buffer may not be emptied. For example, the target amount of data may be determined based on multiplying the input rate by the timeout value to establish the target amount of data. In other embodiments, the target amount of data may be a predetermined amount of data established for the buffer.

The method 600 further includes storing the data to the buffer, at 608. In some embodiments, the intermediary server may include a memory that serves as the buffer. For example, the memory may be configured to cache and/or buffer received data to serve as a proxy between a client and a backend destination. In some embodiments, the data may be stored to the buffer as the data is received from the client. For example, the received data may be transmitted to the buffer as the data is received.

The method 600 also includes detecting that an amount of data in the buffer is at least the target amount of data, at 610. In some embodiments, the buffer may indicate a current amount of buffered data. For example, the buffer may report to a connection manager the current amount of buffered data. While the buffer has an amount of buffered data that is less than the target amount of data, the buffer continues to receive the data from the client.

The method 600 includes initiating sending the buffered data to the backend destination at an output rate that maintains at least the target amount of data in the buffer, at 612. In some embodiments, the output rate may be determined based on the input rate. For example, the output rate may be initially set to be equal to the input rate to ensure that the amount of data received is equal to the amount of data being sent. In other embodiments, the output rate may be lower than the input rate to ensure that the amount of data received is greater than the amount of data being sent.

The method 600 also includes detecting an interruption in receiving the data from the client, at 606. In some situations, a connection from the client may be disrupted due to one or more of a slow connection, an intermittent connection, an inconsistent connection or an unstable connection. For example, the intermediary server may continuously monitor the input rate of receiving the data from the client in order to determine that an interruption has occurred.

The method 600 further includes initiating sending the buffered data to the backend destination at a different output rate, where an amount of data in the buffer is allowed to fall below the target amount of data during the interruption, at 610. In some embodiments, a different output rate may be determined independently of the previous input rate. For example, the different output rate may be a relatively low transmission rate such that a non-zero quantity of data is transmitted to ensure that some amount of data still remains in the buffer. In some embodiments, the target amount of data may be overridden in response to the detected interruption. For example, the buffer may allow continued sending of the buffered data even though continued sending may result in the buffer having less than the target amount of data.

Figure 7:
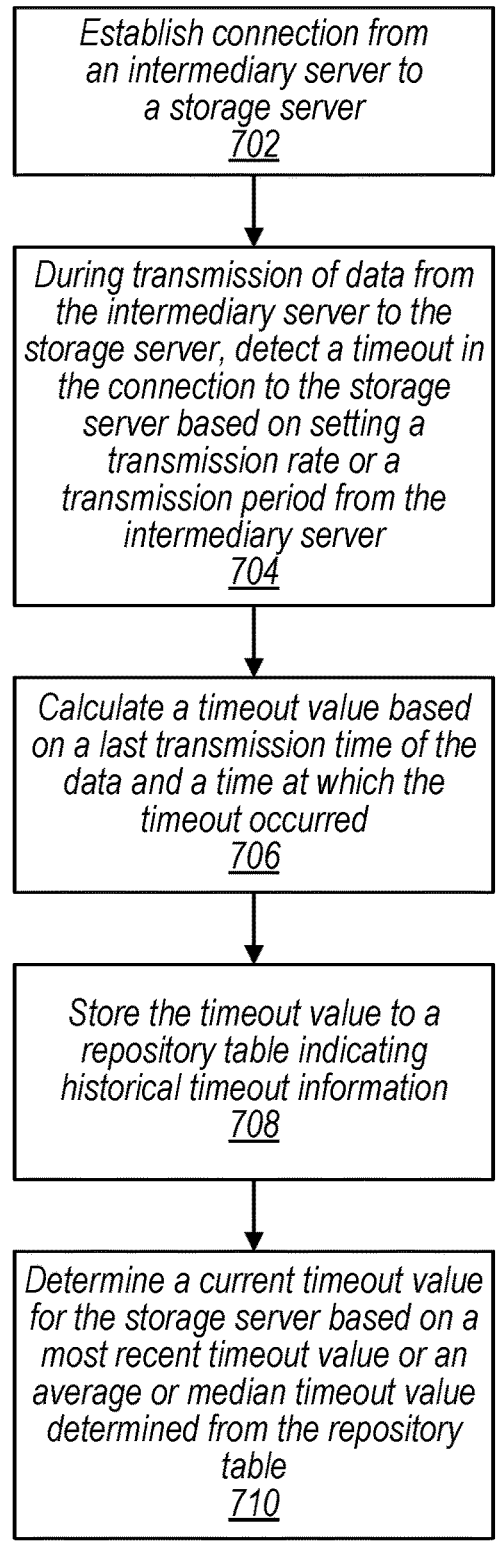
FIG. 7 illustrates a flowchart diagram of a method for maintaining historical data of timeouts for a data storage server, according to some embodiments.

FIG. 7 illustrates a flowchart diagram of a method 700 for maintaining historical data of timeouts for a data storage server, according to some embodiments. The method 700 may be performed by an intermediary server, such as the intermediary server 110 of FIG. 1, the intermediary server 210 of FIG. 2, the intermediary server 310 of FIG. 3, or the hub 420 of FIG. 4.

The method 700 begins by establishing a connection an intermediary server to a data storage server, at 702. The data storage server may corresponding to the storage server 120 of FIG. 1, the storage server 220 of FIG. 2, the storage server 320 of FIG. 3, or the storage server 430 of FIG. 4. In some embodiments, the data storage server may be a backend destination or a transmission destination for data that is stored at the intermediary server. For example, the intermediary server may receive the data from a client to be sent to the data storage server.

The method 700 includes, during transmission of data from the intermediary server to the storage server, detecting a timeout in the connection to the storage server based on setting one or more of a transmission rate or a transmission period from the intermediary server, at 704. In some situations, the connection to the storage server may time out due to inactivity over the connection for a duration of time corresponding to the timeout value. For example, in the event of a connection interruption, the buffered data may have been depleted from the intermediary server such that no additional buffered data is available to send to the storage server prior to timing out. In some embodiments, the timeout in the connection to the storage server may be detected based on the connection being closed by the storage server. In other embodiments, the timeout may be detected based on a subsequent attempt to send the buffered data being rejected by the storage server.

In some embodiments, repeated iterations of 704 may include procedural testing to provoke a timeout from the storage server. For example, transmissions of data may increase output rates over time to cause a larger delay between individual transmissions of data. In other embodiments, transmission periods may be modified to create larger delays between periods of transmission. For example, by decreasing the transmission periods, a timeout may be detected during the gradually larger delays between transmission periods. The procedural testing may be iteratively repeated until the timeout is detected based on increasing the output rate and sending data from the buffer to the storage server at the increased output rate. The detected timeout may be then determined and recorded.

The method 700 also includes calculating a timeout value based on a last transmission time of the data and a time at which the timeout occurred, at 706. The timeout value may indicate a period of time that may result in a timeout. In some embodiments, the intermediary server may calculate the timeout value by starting with the time at which the timeout occurred and subtracting the last transmission time. In other embodiments, the timeout value may be based on tracking a period of time from the last transmission time.

The method 700 further includes storing the timeout value to a repository table indicating historical timeout information, at 708. In some embodiments, the repository table may be metadata for the storage server. In other embodiments, the repository table may include data for a plurality of storage servers or a plurality of endpoints which includes information pertaining to the storage server. The timeout value may be recorded to be used as historical data for subsequent connection attempts to the storage server.

The method 700 also includes determining a current timeout value for the storage server based on a most recent timeout value, an average timeout value, or a median timeout value determined from the repository table, at 710. In some embodiments, subsequent connection attempts to the storage server may require a current timeout value to determine one or more of an output rate or a target amount of data for a buffer, as described herein. In some embodiments, the determined current timeout value may be specific on a per-server basis.

Figure 8:
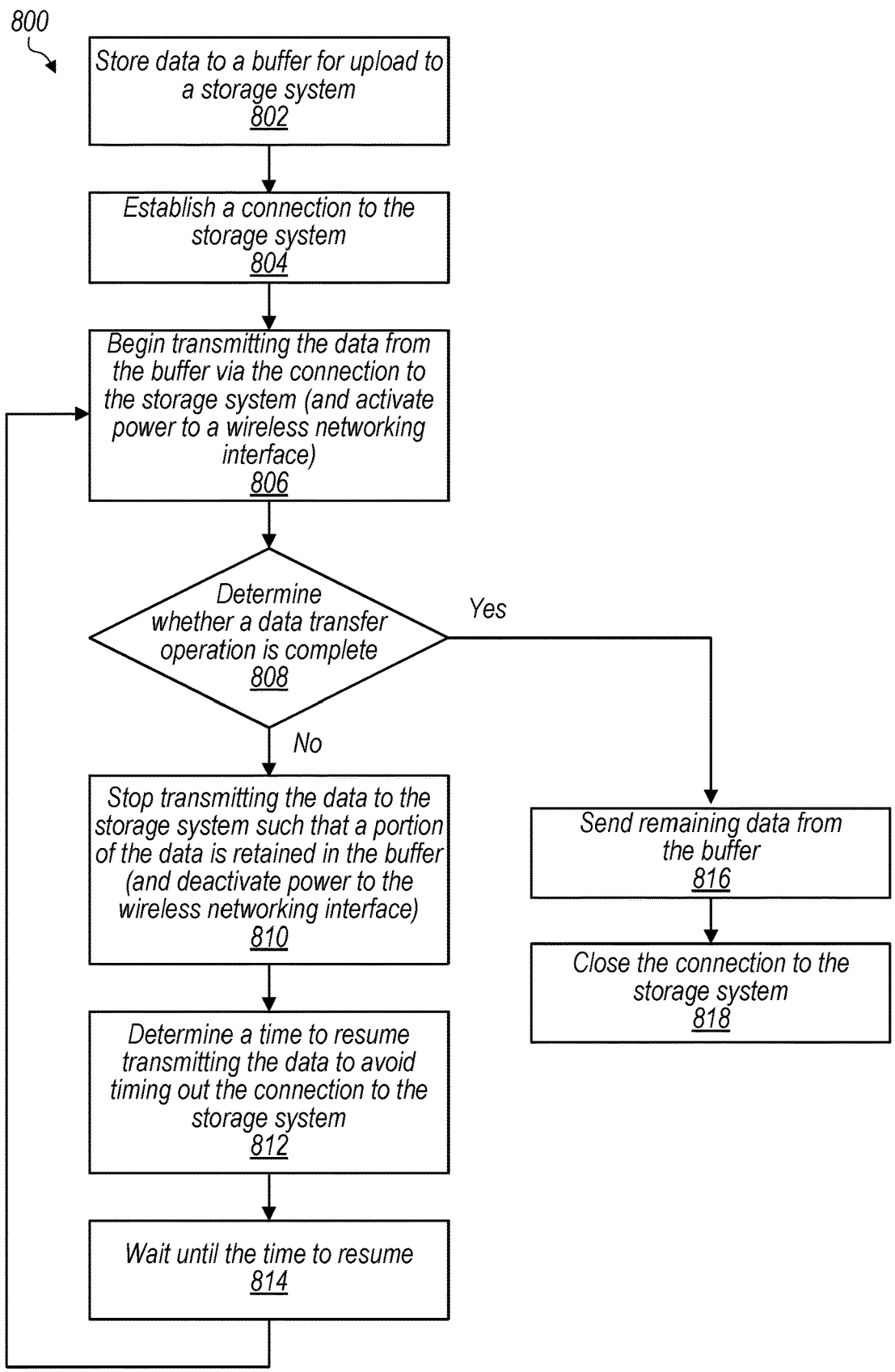
FIG. 8 illustrates a flowchart diagram for a method for scheduling transmission times to avoid connection timeouts for data uploads, according to some embodiments.

FIG. 8 illustrates a flowchart diagram for a method 800 for scheduling transmission times to avoid connection timeouts for data uploads, according to some embodiments. The method 800 may be performed by an intermediary server, such as the intermediary server 110 of FIG. 1, the intermediary server 210 of FIG. 2, the intermediary server 310 of FIG. 3, or the hub 420 of FIG. 4. In other embodiments, the method 800 may be performed by the devices 301a . . . e of FIG. 3, a device 401 or the device 410 of FIG. 4.

The method 800 may include storing data to a buffer for upload to a storage system, at 802. In some embodiments, a memory may serve as the buffer. For example, the memory may be configured to cache and/or buffer received data to serve as a proxy between a client and a backend destination. The data may be received from a client to be uploaded to the storage system via the intermediary server. In other embodiments, the data may be received from one or more sensors configured to generate sensor data.

The method 800 may also include establishing a connection to the storage system, at 804. In some embodiments, establishing the connection to the storage system may be deferred or delayed until the buffer has stored a target amount of data. For example, the buffer may store up to and including the target amount of data and inform one or more other components of the intermediary server that the buffer has reached the target amount of data stored. A connection may be established using one or more output network interfaces. In some embodiments, establishing the connection to the data storage server may include receiving an indication of a timeout value from the data storage server. In other embodiments, establishing the connection to the data storage server may include sending a request indicating a particular timeout value that the intermediary server requests to be the timeout value used by the data storage server. In other embodiments, the intermediary server and the data storage server may negotiate the timeout value such that both entities mutually agree on the timeout value.

The method 800 may also include beginning transmitting the data from the buffer via the connection to the storage system, which may include activating power to a wireless networking interface in embodiments that utilize a wireless networking interface, at 806. In some embodiments, a wireless networking interface may be powered on to facilitate transmitting the data. For example, the wireless networking interface may be deactivated for power consumption management purposes, so the wireless networking interface may need to be activated to transmit data.

The method 800 may also include whether a data transfer operation is complete, at 808. In some embodiments, the connection may be held open for subsequent transmissions of data, e.g., the data transfer operation is not complete. In other embodiments, the connection may be held open for use cases where a device, such as an IoT device, may need to continuously transmit data to the storage server. The connection may not need to be held open based on a determination that the device has concluded the data transfer operation, in some embodiments. Based on a determination that the data transfer operation is not complete, the method may continue to 810. Based on a determination that the data transfer operation is complete, the method may continue to 816.

Based on a determination that the data transfer operation is not complete, the method 800 may further include stopping transmitting the data to the storage system such that a portion of the data is retained in the buffer, which may include deactivating power to the wireless networking interface in embodiments that utilize a wireless networking interface, at 810. In some embodiments, the wireless networking interface may be disabled after sending the buffered data to the storage server. For example, the wireless networking interface may be deactivated to conserve power and/or bandwidth. In some embodiments, data may be retained in the buffer in order to have data to send at a subsequent transmission in order to avoid a connection timeout with the storage system.

The method 800 may further include determining a time to resume transmitting the data to avoid timing out the connection to the storage system, at 812. In some embodiments, the time to resume may correspond to a time delay that is shorter than a timeout value for the storage system. For example, the time to resume may indicate a duration of time to wait until the data is sent to the storage server. In other embodiments, the time to resume may indicate a particular point in time in which sending the data is to begin. For example, the transmission time may be calculated based on a last transmission time, adding the timeout value and subtracting an amount of time to ensure that the transmission time would occur prior the connection timing out.

The method 800 also includes waiting until the time to resume, at 814. In some embodiments, while the device is waiting until the time to resume, the device may continue collecting data and storing the data to the buffer for a subsequent transmission of data. After the time to resume, the method 800 repeats at 806.

Based on a determination that the data transfer operation is complete, the method 800 may conclude by sending any remaining data or additional data from the buffer, at 816. In some embodiments, the buffer may be purged based on a determination that the data transfer operation is complete. In some situations, the buffer may have remaining data or additional data that no longer needs to be maintained in the buffer after the data transfer operation is complete. The method 800 may conclude by closing the connection to the storage system, at 818.

Figure 9:
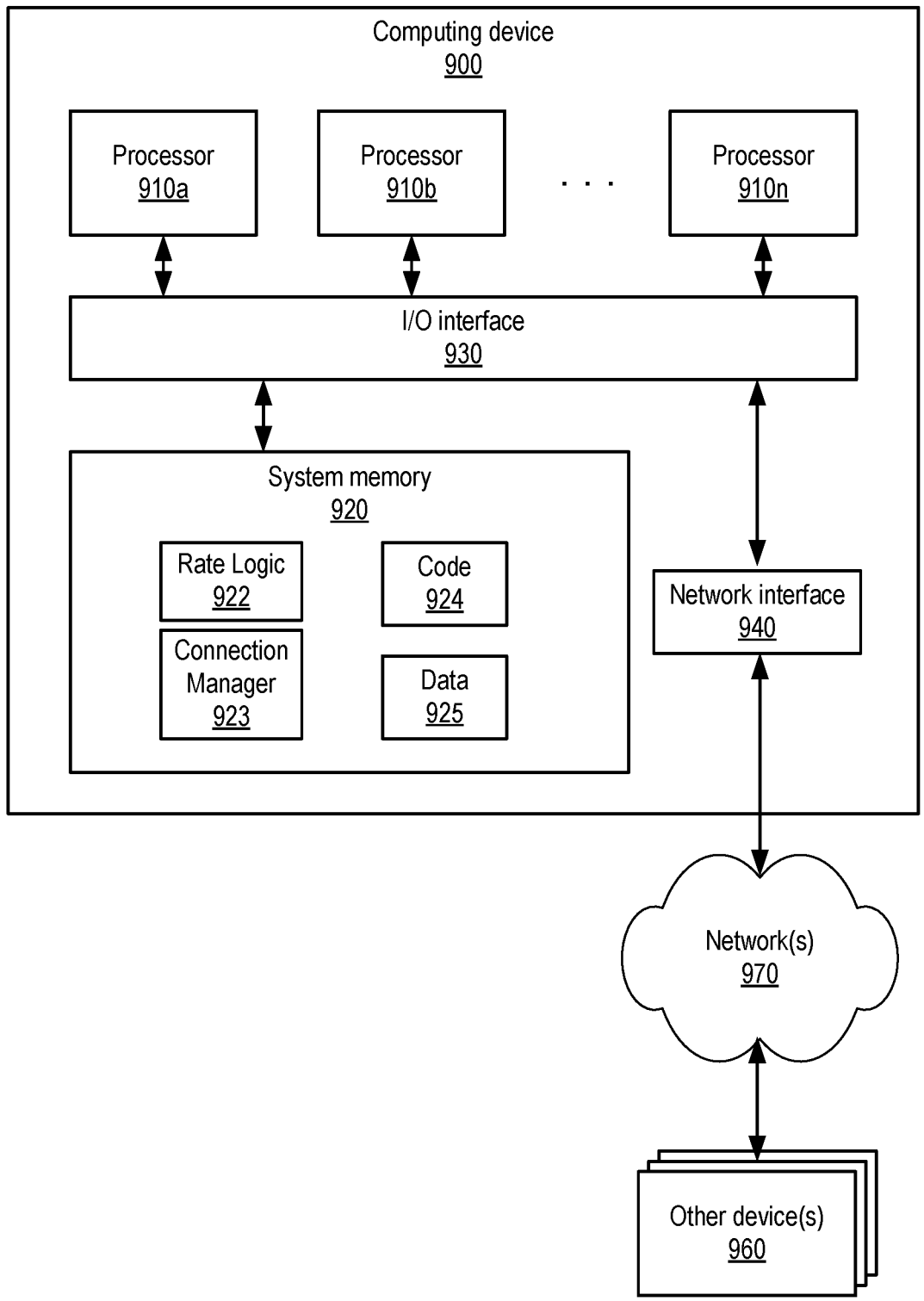
FIG. 9 is a block diagram illustrating an example computer system that may be used in some embodiments.

Any of various computer systems may be configured to implement techniques for managing memory compression in a secure manner, as disclosed herein. For example, FIG. 9 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 900 such as that illustrated in FIG. 9 or one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 920 as program instructions 924. In some embodiments, system memory 920 may include data 925 which may be configured as described herein. In some embodiments, system memory 920 may include rate logic 922. For example, rate logic 922 may perform the functions of rate logic 114 of the intermediary server 110 of FIG. 1. As an alternative example, rate logic 922 may determine transmission rates for an intermediary server 110 of FIG. 1. As another example, rate logic 922 may determine transmission rates for an intermediary server 310 of FIG. 3. In some embodiments, system memory 920 may include connection manager 923. For example, connection manager 923 may perform the functions of the connection manager 116 of FIG. 1 or the connection manager 316 of FIG. 3.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as between client devices (e.g., 960, etc.) and other computer systems, or among hosts, for example. In particular, network interface 940 may be configured to allow communication between computer system 900 and/or various other devices 960 (e.g., I/O devices). Other devices 960 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks 970, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, which may be implemented via network interface 940.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device (e.g., cursor control device, keyboard, or display(s) may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc.

For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a memory configured to:
store data, received from a client device, in a buffer for upload to a storage system according to a data transfer operation for receiving the data into the buffer; and
one or more computing devices configured to implement a connection manager to:
establish a connection to the storage system;
iteratively repeat, until the data transfer operation for receiving the data into the buffer is completed and the data has been completely sent from the client device to the buffer:
begin transmitting the data from the buffer via the connection to the storage system;
stop transmitting the data from the buffer via the connection to the storage system, wherein at least a portion of the data is retained in the buffer after transmitting the data has stopped;
determine a time to resume transmitting the data from the buffer via the connection to the storage system to avoid a connection timeout for the connection to the storage system; and
wait until the time to resume;
wherein said iteratively repeat said begin, said stop, said determine and said wait stops iterating once the data transfer operation for receiving the data into the buffer is completed and the data has been completely sent from the client device to the buffer; and
send additional data from the buffer via the connection to the storage system.

2. The system of claim 1, further comprising:
a wireless network interface configured to be activated to transmit the data from the buffer via the connection to the storage system;
wherein the connection manager is configured to:
after transmitting the data has stopped, deactivate power to the wireless network interface.

3. The system of claim 1, wherein the connection manager is further configured to:
based on a determination that the data transfer operation is complete, close the connection to the storage system.

4. The system of claim 1, further comprising:
one or more sensors configured to generate sensor data, wherein the one or more sensors comprise one or more of a temperature sensor, a camera, a motion sensor, a proximity sensor, or any combination thereof, and wherein the data stored in the buffer comprises the sensor data.

5. The system of claim 1, wherein the connection manager is further configured to:
determine a timeout value for the storage system based on historical data indicating previous timeouts for other connections to the storage system, wherein the time to resume is determined based further on the timeout value.

6. A method, comprising:
performing, with one or more computing devices:
storing data, received from a client device, in a buffer for upload to a storage system according to a data transfer operation for receiving the data into the buffer;
establishing a connection with the storage system;
iteratively repeating, until the data transfer operation for receiving the data into the buffer is completed and the data has been completely sent from the client device to the buffer:
beginning transmission of the data from the buffer via the connection to the storage system;
stopping the transmission of the data, wherein at least a portion of the data is retained in the buffer after transmitting the data has stopped;
determining a time to resume the transmission of the data to avoid a connection timeout on the connection with the storage system; and
waiting until the time to resume;
wherein said iteratively repeating said beginning, said stopping, said determining and said waiting stops iterating once the data transfer operation for receiving the data into the buffer is completed and the data has been completely sent from the client device to the buffer; and
sending additional data from the buffer to the storage system.

7. The method of claim 6, further comprising:
before beginning the transmission of the data, activating a wireless network interface configured to transmit the data from the buffer via the connection to the storage system; and
after stopping the transmission of the data, deactivating the wireless network interface.

8. The method of claim 6, further comprising:
based on a determination that the data transfer operation is complete, closing the connection with the storage system.

9. The method of claim 6, further comprising:
generating, by one or more sensor devices, sensor data, wherein the data transfer operation comprising transmitting the sensor data from the one or more sensor devices to the buffer, and wherein the data stored in the buffer comprises the sensor data.

10. The method of claim 9, wherein the sensor data comprises one or more of temperature data, image data, audio data, motion data, proximity data, or any combination thereof.

11. The method of claim 6, further comprising:
determining a timeout value for the storage system based on historical data indicating previous timeouts for other connections to the storage system, wherein the time to resume is determined based further on the timeout value.

12. The method of claim 11, further comprising:
detecting a connection timeout with the storage system;
storing information pertaining to the connection timeout to the historical data; and
determining an updated timeout value based on the historical data.

13. The method of claim 11, further comprising:
determining a target amount of data to maintain in the buffer based on the timeout value, wherein the connection to the storage system is established after storing the target amount of data in the buffer.

14. One or more non-transitory, computer-readable storage media storing instructions that, when executed on or across one or more processors, cause the one or more processors to:
store data, received from a client device, in a buffer for upload to a storage system according to a data transfer operation for receiving the data into the buffer;
establish a connection to the storage system;
iteratively repeat, until the data transfer operation for receiving the data into the buffer is completed and the data has been completely sent from the client device to the buffer:
begin transmitting the data from the buffer to the storage system;
stop transmitting the data, wherein at least a portion of the data is retained in the buffer after transmitting the data has stopped;
determine a time to resume the transmission of the data to avoid a connection timeout of the connection with the storage system; and
wait until the time to resume;
wherein said iteratively repeat said begin, said stop, said determine and said wait stops iterating once the data transfer operation for receiving the data into the buffer is completed and the data has been completely sent from the client device to the buffer; and
send additional data from the buffer to the storage system.

15. The one or more non-transitory, computer-readable storage media of claim 14, further comprising instructions that, when executed on or across the one or more processors, cause the one or more processors to:
before said begin transmitting the data, activate a wireless networking interface configured to transmit the data from the buffer to the storage system; and
after said stop transmitting the data, deactivate the wireless networking interface.

16. The one or more non-transitory, computer-readable storage media of claim 14, further comprising instructions that, when executed on or across the one or more processors, cause the one or more processors to:
based on a determination that the data transfer operation is complete, close the connection to the storage system.

17. The one or more non-transitory, computer-readable storage media of claim 14, further comprising instructions that, when executed on or across the one or more processors, cause the one or more processors to:
determine a timeout value for the storage system based on historical data indicating previous timeouts for other connections to the storage system, wherein the time to resume is determined based further on the timeout value.

18. The one or more non-transitory, computer-readable storage media of claim 17, further comprising instructions that, when executed on or across the one or more processors, cause the one or more processors to:
detect a connection timeout with the storage system;
store information pertaining to the connection timeout to the historical data; and
determine an updated timeout value based on the historical data.

19. The one or more non-transitory, computer-readable storage media of claim 17, further comprising instructions that, when executed on or across the one or more processors, cause the one or more processors to:
determine a target amount of data to maintain in the buffer based on the timeout value, wherein the connection to the storage system is established after storing the target amount of data in the buffer.

20. The one or more non-transitory, computer-readable storage media of claim 14, wherein the data transfer operation comprises:
receiving sensor data from one or more sensor devices, wherein the sensor data comprises one or more of temperature data, image data, audio data, motion data, proximity data, or any combination thereof.

* * * * *